United States Patent [19]
Laskey

[11] Patent Number: 6,101,889
[45] Date of Patent: Aug. 15, 2000

[54] BALL SCREW AND NUT LINEAR ACTUATOR ASSEMBLIES AND METHODS OF CONSTRUCTING AND OPERATING THEM

[75] Inventor: David Ray Laskey, Bay City, Mich.

[73] Assignee: Thomson Saginaw Ball Screw Company, LLC, Saginaw, Mich.

[21] Appl. No.: 09/218,531

[22] Filed: Dec. 21, 1998

Related U.S. Application Data

[60] Provisional application No. 60/071,912, Jan. 20, 1998.

[51] Int. Cl.[7] .............................. F16H 25/20; G01D 5/04
[52] U.S. Cl. .................................... 74/89.15; 74/424.8 R; 116/282; 192/141
[58] Field of Search ........................... 74/89.15, 424.8 R; 116/282; 192/141, 143

[56] References Cited

U.S. PATENT DOCUMENTS

| | | | |
|---|---|---|---|
| 997,648 | 7/1911 | Cavanagh et al. | 116/282 X |
| 2,154,962 | 4/1939 | Skaraas et al. | 116/282 |
| 2,417,114 | 3/1947 | Kilham | 116/282 |
| 2,504,018 | 4/1950 | Gibson et al. | 192/141 X |
| 2,768,604 | 10/1956 | Enerud | 116/282 X |
| 3,103,909 | 9/1963 | Anderson | 116/31 |
| 3,727,472 | 4/1973 | Maekawa | 74/89.15 |
| 4,295,384 | 10/1981 | Brandt et al. | . |
| 4,310,144 | 1/1982 | Nogaki | 74/424.8 R |
| 4,392,390 | 7/1983 | Johnson | . |
| 4,598,238 | 7/1986 | Scarano | . |
| 4,895,048 | 1/1990 | Key et al. | . |
| 5,090,513 | 2/1992 | Bussinger | . |
| 5,542,744 | 8/1996 | Bathrick | 74/89.15 X |
| 5,868,032 | 2/1999 | Laskey | . |

*Primary Examiner*—Allan D. Herrmann
*Attorney, Agent, or Firm*—Reising, Ethington, Barnes, Kisselle, Learman & McCulloch, P.C.

[57] ABSTRACT

A ball screw and nut linear actuator has a motor and a ball nut and screw assembly in side by side disposition. Gearing connects with the motor shaft to drive the screw and a housing for the gearing and ball nut and screw assembly includes an elongate housing tube within which the screw assembly is housed. The nut incorporates an extension sleeve assembly for extending movement out of the housing tube which anchors the screw against axial movement while jounaling it for rotation. A pin and axial track connection between the extension sleeve assembly and the housing tube guides the extension sleeve assembly in axial movement and prevents relative rotation of the housing tube and sleeve assembly.

18 Claims, 3 Drawing Sheets

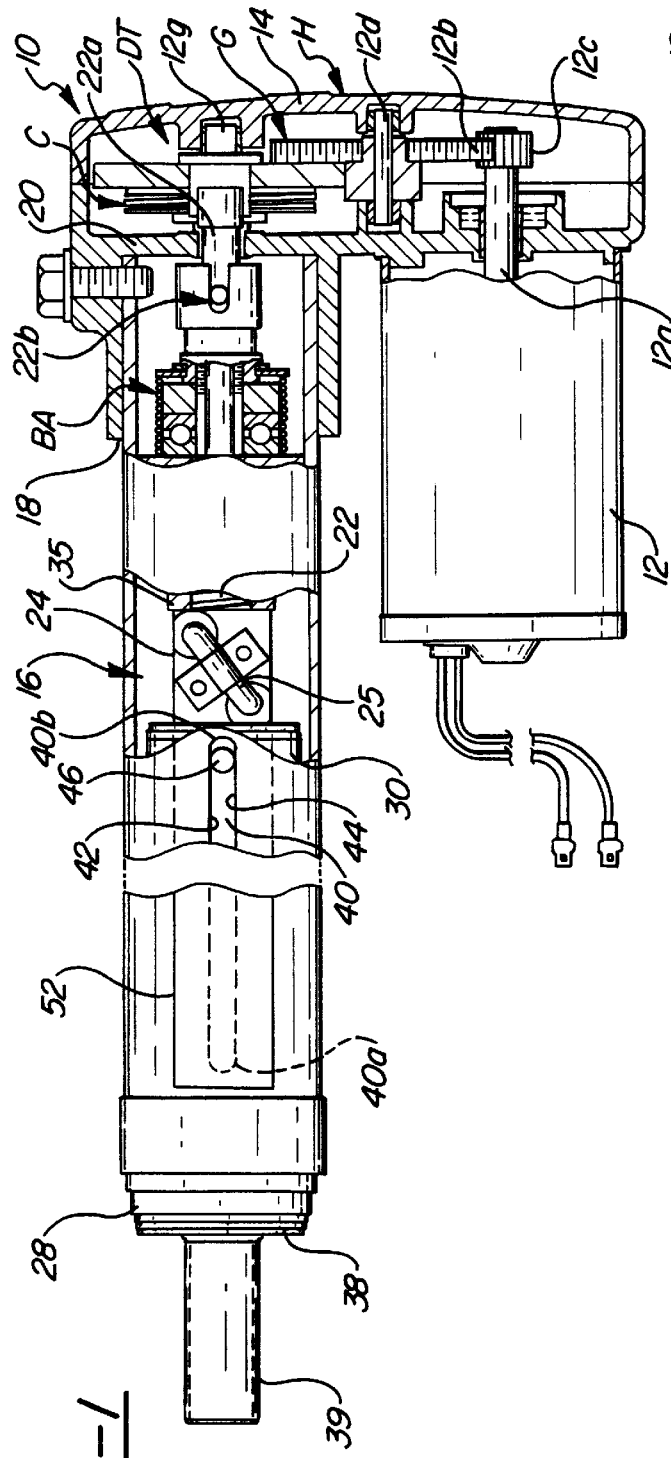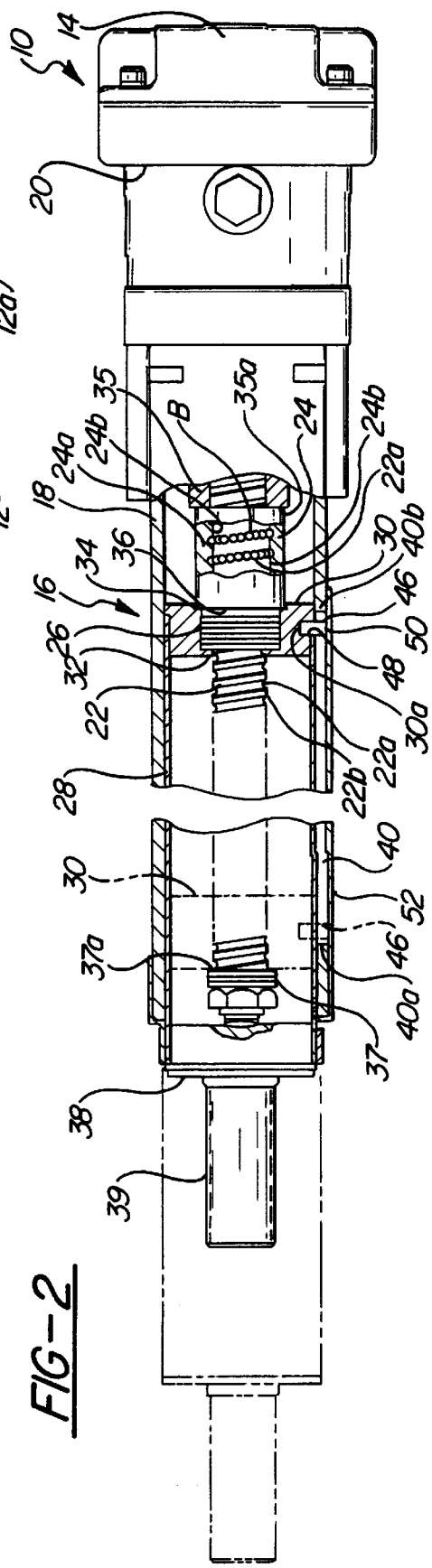
FIG-1
FIG-2

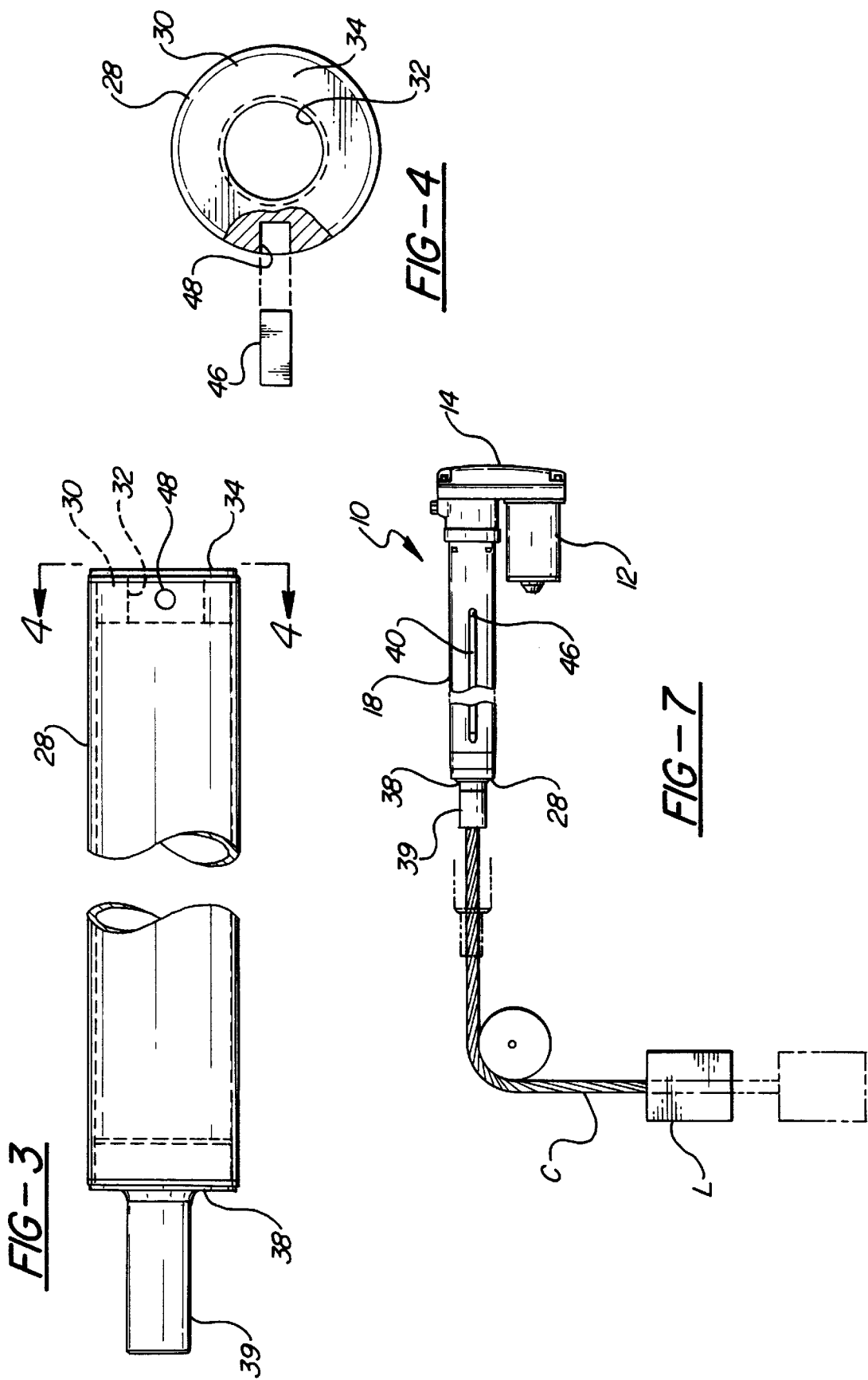

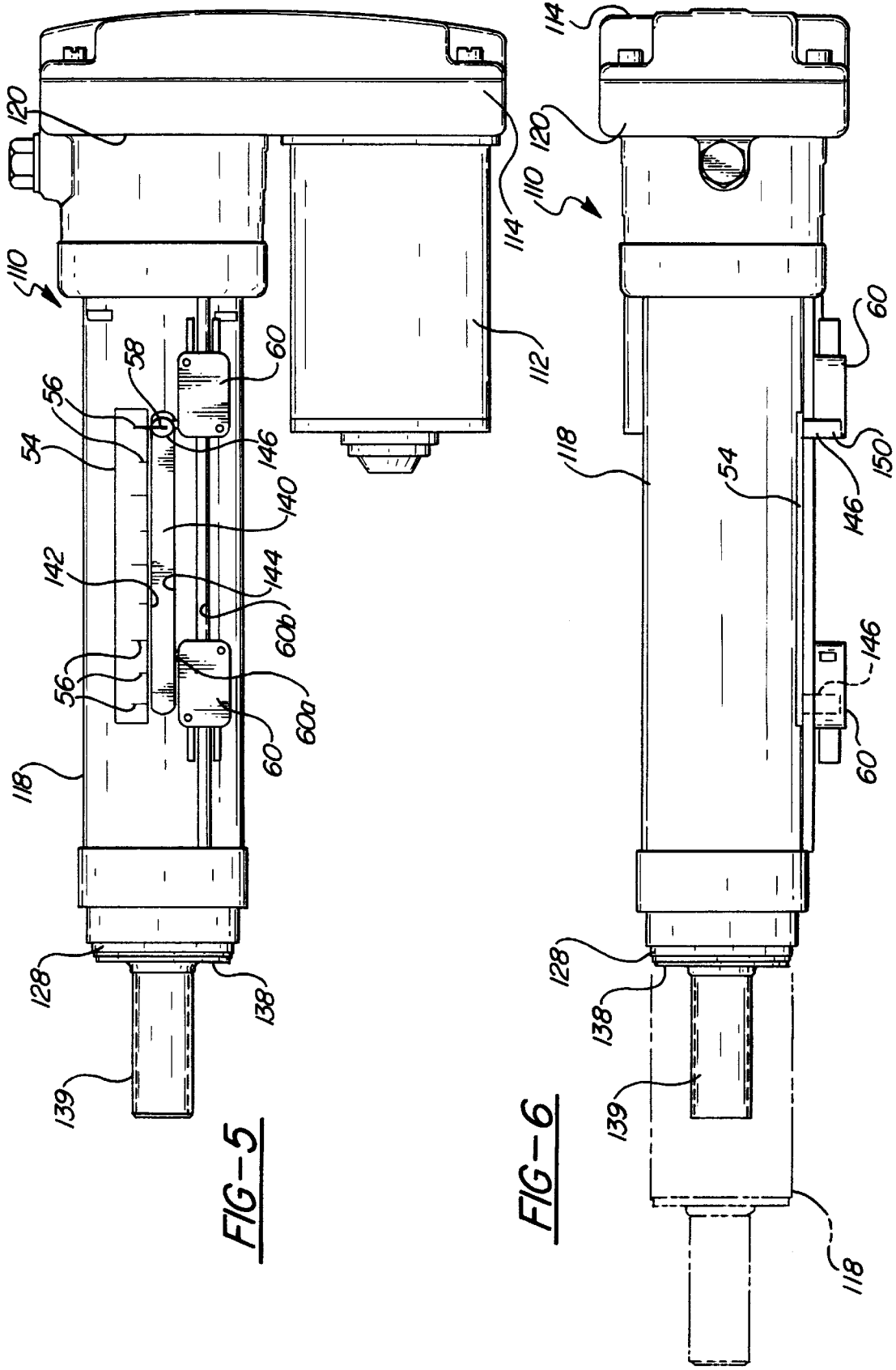

6,101,889

BALL SCREW AND NUT LINEAR ACTUATOR ASSEMBLIES AND METHODS OF CONSTRUCTING AND OPERATING THEM

This invention particularly relates to motor driven ball screw and nut assemblies which are useful as linear actuators. The application claims the priority of U.S. provisional application Ser. No. 60/071,912 filed Jan. 20, 1998.

BACKGROUND OF THE INVENTION

Linear ball screw-type actuators are used in many applications to transmit linear motion in performing such operations as opening and closing, raising and lowering, pushing and pulling, advancing and retracting, and positioning various devices. Many such linear actuators include an axially restrained screw supported for motor-driven rotation within a fixed outer tube. A ball nut is carried on the screw, and is formed with an internal helical groove that matches a helical groove formed in the screw to accommodate one or more raceway circuits of recirculating load bearing balls. An inner tube is received in the outer tube and is fixed to the ball nut. The inner tube typically mounts a clevis or other coupling at its free end for connection with the device to be actuated. As the screw turns, the ball nut converts the rotary motion of the screw into linear motion of the inner tube, provided the ball nut is rotationally restrained.

Typically, the inner and outer tube members are fabricated of cylindrical tubing and presently, to my knowledge, there is nothing in the construction of the tube members or nut that acts to restrain the inner tube, and thus the nut, against rotation. In most applications, however, this does not present a problem since the inner tube is restrained against rotation by virtue of its attachment to the device to be actuated. In such applications, therefore, the inner tube will not rotate relative to the outer tube, since the device to which it is attached acts to restrain the inner tube from rotating.

There are, however, some applications in which the member to be actuated is not able to restrain the inner tube and nut against rotation, such as when the inner tube of the actuator is to attach to a flexible chain or cable. Such devices tend to twist or rotate with the inner tube, particularly at the fully extended and retracted positions of the inner tube. Where such rotation is objectionable, the approach in the past has been to select non-lead screw type actuators or to utilize a ball screw actuator of the general type described, but in which the telescoping tube members are fabricated of square rather than cylindrical tubing, adding unnecessarily to the cost, weight, and complexity of the actuator.

One of the principal objectives of the present invention is to provide a mechanism and method of restraining the cylindrical inner tube against rotation relative to the fixed outer tube without relying upon the connection to an external device.

SUMMARY OF THE INVENTION AND ADVANTAGES

The present invention achieves its result by incorporating an anti-rotation connection between the inner and outer tubes that operates to enable the inner tube to telescope relative to the outer tube while restraining the inner tube against rotation.

Another object of the invention is to provide such an anti-rotation connection that is simple to manufacture and does not interfere with the normal operation of the actuator.

According to another object of the invention, the anti-rotation connection is provided by a linear slot formed in the outer tube and a corresponding guide pin fixed to the nut assembly and accommodated in the slot to permit linear movement while precluding rotational movement of the inner tube relative to the outer tube.

According to a particular embodiment, the pin extends radially beyond the outer tube and as such may serve as an indicator of the relative position of the inner tube. The projecting pin may also serve to activate external limit switches used to control the positioning of the actuator.

According to still a further object of the invention, a method of construction is provided wherein the inner tube of a ball screw actuator is prevented from rotating relative to the fixed outer tube and the method involves forming a longitudinally extending slot in the outer tube having a length slightly longer than the stroke length of the inner tube. A pin is then extended through the slot and press fitted into a bore provided in the nut assembly for travel along the slot during linear movement of the inner tube, while reacting, against the walls of the slot to preclude rotational movement.

These and other objects, advantages, and features of the present invention will become more readily apparent from the following detailed description when taken together with the accompanying drawings, wherein:

THE DRAWINGS

FIG. 1 is a partly sectional, elevational, somewhat schematic view of a typical ball screw actuator fitted with an anti-rotation device which is constructed in accordance with the invention;

FIG. 2 is a partly sectional, schematic top view of the ball screw actuator of FIG. 1 shown in the fully retracted position, chain lines indicating its extended position;

FIG. 3 is a fragmentary, elevational view of the inner tube or operating sleeve of the actuator;

FIG. 4 is a partly sectional end elevational view of the inner tube viewed along the lines 4—4 of FIG. 3, and shown in connection with the reaction pin;

FIG. 5 is an elevational view of an alternative embodiment of the invention;

FIG. 6 is a top plan view of the actuator of FIG. 5 with the inner tube and guide pin shown in the fully retracted position, chain lines indicating its fully extended position; and FIG. 7 is an elevational view of the actuator shown coupled to a flexible cable or chain and actuating movement of a load.

DETAILED DESCRIPTION

With reference to FIGS. 1–4 initially, there is illustrated an electromechanical linear actuator assembly 10 having a reversible electric motor 12 with a drive shaft 12a, gear box 14, and a ball nut and screw mechanism, generally indicated at 16, housed within a fixed outer tube 18. The gear box 14 has an upper plate 20 and together with tube 5 forms an overall housing H.

The mechanism 16 includes a typical ball screw 22 provided with helical ball-accommodating groove portions 22a separated by helical land portions 22b. Coaxially provided on the screw 22, is a ball nut 24 of the usual type which has mating internal groove and land portions 24a and 24b respectively, and is provided with an exterior ball return tube 25 to recirculate a train of abutting load bearing balls B to cause linear movement of the ball nut 24 along the ball screw 22 in response to rotation of the screw. Such ball screw mechanisms are well known to those of ordinary skill in the art, and further details concerning their construction and operation are disclosed, for example, in U.S. Pat. No. 5,485,760, which is owned by the assignee of the present invention, and its disclosure incorporated herein by reference.

The nut 24 is provided with an externally threaded flange 26 (FIG. 2) for mounting an inner extension tube or sleeve assembly 28 via an adaptor ring 30. The inner and outer tubes 28, 18 comprise elongate cylindrical members fabricated of heavy-wall steel, aluminum, or other suitable material. As illustrated best in FIG. 2, the inner tube or sleeve 28 has an outer diameter which is slightly less in dimension than that of the inner diameter of the outer housing tube 18 to permit sliding telescopic movement of the inner tube or sleeve 28 within the outer tube between the fully retracted solid line position, and the fully extended chain line position, respectively, shown in FIG. 2.

The adapter ring 30 comprises an annular metal insert accommodated within the open inner end of the tube or sleeve 28 and fixed thereto by a weldment or the like. The adapter ring 30 is formed with a threaded longitudinal bore 32 having a size and threads complementing that of the flange 26 to enable the adapter ring 30, and thus the inner tube or sleeve 28, to be threaded into engagement with the flange 26 of the ball nut 24. When fully engaged, an end face 34 of the adapter ring 30 confronts an opposing face 36 of the nut 24 to secure the sleeve 28 firmly but releasably to the ball nut 24 and moves with the nut 24 along the ball screw 22. Thus, ring 30 may be considered to be a part of nut 24.

The opposite free end of the inner tube or sleeve 28 extends longitudinally from the outer housing tube 18 and mounts a connector 38 which may comprise an insert fixed within the end of the tube 28. The connector 38 includes an end fitting 39 that, in the illustrated embodiment, takes the form of an externally threaded shank. Other types of end fittings commonly used in linear actuator applications, such as clevises, may also be employed.

The electric motor 12 activates the ball screw 22 through gearing, generally designated, G inside the gear box 14, causing the screw 22 to rotate about its axis within the fixed outer tube 18. The gearing G may include a spur gear 12b driven by armature shaft 12a via pinion 12c, spur gear 12b being fixed on a shaft 12d mounting a pinion 12e in mesh with a pinion gear 12f on shaft 12g in alignment with screw 22. The shaft 12g disengageably drives screw 22 through the well known friction clutch assembly C in the usual manner. A typical friction clutch which can be employed is illustrated in U.S. Pat. No. 5,090,513. The gearing G and clutch C form part of a drive transmission system DT. As usual, shaft 12g normally drives screw stub shaft 22a, which has a pin and slot connection 22b with the inboard shaft end 22c of screw 22 so that it functions as a portion of screw 22, via the clutch C. Bearing assemblies such as shown at B are supported by tube 18 to journal the screw shaft portion 22c.

The ball nut 24 converts the rotary motion of the motor 12 and screw 22 into linear motion of the nut 24 and inner tube assembly 28, enabling the inner tube 28 to telescope relative to the fixed outer housing tube 18 between the extreme positions illustrated in FIG. 2. As shown best in FIG. 2, the outer tube 18 supports a fixed stop 35, which could be carried on the tube 18 or on screw 22, and which confronts the nut 24 at the point of full retraction to limit inward movement of the extension tube 28. The screw 22 likewise carries a stop 37 adjacent its outboard end which is confronted by the nut 24 at full extension of the tube 28 to limit outward movement of the extension tube 28. The stops 35 and 37 have opposed stop surfaces 35a and 37a. The direction of travel of the inner tube 28 is governed by the direction of rotation of the ball screw 22.

The components and operation of the actuator thus far described are conventional. Thus far, it will be seen that there is nothing to restrain the inner tube 28 and nut 24 against some rotation. It will be appreciated that for the ball nut and screw mechanism 16 to operate in the intended manner to convert the full rotary motion of the screw into full linear motion of the inner tube 28, the inner tube 28 must not rotate with the screw 22. In most applications in which such ball screw-type actuators are utilized, the end fitting or connector 38 of the inner tube is coupled to a device to be actuated that, by its design, is rigid in the direction of rotation of the inner tube and as such provides the needed resistance to rotation of the inner tube. For example, if the inner tube or sleeve 28 is used to actuate a lever, the connection of the clevis end of the inner tube 18 with the lever would act to secure the inner tube or sleeve against rotation, enabling the nut 24 to fully and accurately convert the full rotational motion of the screw 22 into full consequent linear motion of the inner tube 28.

In other applications, however, the device to be actuated may not provide such resistance to rotation of the inner tube or sleeve 28. In FIG. 7, for example, the actuator 10 is coupled to a flexible chain or cable C to activate a load L. The chain or cable C may offer some, but not complete, resistance to rotation of the inner tube 28. Such rotation of the inner tube 28 may impart a twist to the cable or chain C, or cause a load L that the chain or cable is supporting to turn, either or both of which is normally objectionable.

A principal object of the present invention is to provide built-in mechanism preventing rotation of the inner tube member 28 relative to the fixed outer tube 18 and to make possible other functions, while retaining the capability of the inner tube or sleeve 28 to telescope linearly relative to the outer tube 18. According to a presently preferred embodiment of the invention, the inner and outer tube members are fitted with co-acting portions that permit linear telescoping movement of the inner tube in its predesignated stroke, but co-act with one another to prevent rotation of the inner tube 28 within the outer tube 18.

As illustrated in the drawings, the presently preferred construction of the interactive portions of the inner and outer tubes comprises the pin and track mechanism depicted. As shown in FIGS. 1–4, the outer housing tube 18 is formed with a slot or track 40 that extends in the longitudinal direction of the tube. The slot or track 40 is formed with a length, as shown in FIG. 2, that is slightly greater at each end than the stroke length of the inner tube 28 which is determined by nut stopping surface 37a and 35a. The walls of the slot 40 present opposed, longitudinally extending guide or bearing surfaces 42, 44 that are preferably uniformly spaced along the length of the slot 40. As shown in the drawings, it is preferred that the slot or track 40 extend completely through the wall of the outer tube 18 for manufacturing ease. The invention contemplates, however, that the slot or track 40 may be machined into the interior wall of the outer tube 18 so as not to extend completely through to the exterior of the tube, if desired.

A reaction ring pin 46 is mounted on the ring 30 to extend through inner tube assembly 28 and extends into, and is accommodated within, the slot or track 40. As shown in FIGS. 3 and 4, the pin 46 is preferably mounted within a radial bore 48 extending through the wall of the inner tube 28 and into a bore 30a in the adapter ring 30 at the inner end of the tube 28. The pin 46 is preferably press fitted into the bores 30a and 48 such that it is secured to the nut assembly and has an extended portion 50 that, in the first embodiment disclosed herein, is of such radial length as to extend into the slot 40, but terminates short of the outer wall surface of the outer tube 18. The slot 40 may be covered by a strip of adhesive tape, a plate, or other suitable element 52 to close the slot 40 and seal off the interior of the outer tube 18 while accommodating the sliding of the pin 46 along the slot 40.

In operation, as the ball screw 22 turns, any rotational forces imparted to the ball nut 24 that are not counteracted by the connection of the inner tube 28 to the device to be actuated, are transmitted by the reaction pin 46 to one or the other of the bearing surfaces 42, 44 of the slot 40, thereby precluding any rotation of the inner tube 28 relative to the fixed outer tube 18. The pin 46 and slot or track 40 are located relative to one another such that the inner tube assembly 28 is able to travel between the fully retracted and extended positions without interference by the pin and slot members 46, 40. The slot or track 40 is slightly longer than the required stroke of the inner tube 28, and is located such that the pin 46 is spaced a small distance from the ends 40a and 40b of the slot 40 when in the fully retracted and extended positions.

Anchoring the pin 46 in the nut adapter ring 30 has the advantage of providing solid support to the pin 46 and minimizing the stress placed on the wall of the inner tube 28 during reaction of the pin 46 with the walls of the slot 40.

In a method of constructing and operating the actuator of the invention, the slot 40 is machined in the outer wall of the tube 18 in the longitudinal direction at a location and in a length to accommodate full extension and retraction of the inner tube 28. The bore 48 is machined through the wall of the inner tube 28 and into the adapter 30 to provide seat bore 30a, and the reaction pin 46 is extended through the slot 40 and its inner end press fitted into the bores 48 and 30a. A device to be actuated, such as a chain or cable, is coupled to the connector 38 and actuated in the usual manner. Any rotational forces imparted to the inner tube 28, particularly as it arrives at its extreme travel positions, are counteracted by reaction of the pin 46 within the slot 40.

An alternative embodiment of the invention is illustrated in FIGS. 5 and 6. Corresponding reference numerals are used to designate like parts, but are offset by the numeral 100. The assembly of the second embodiment 110 is identical in construction and operation to that of the first embodiment, except that the extended portion 50 of the reaction pin 146 projects out of and beyond the periphery of the outer tube 118. The covering 52 over the slot is omitted.

In this configuration, the extended pin portion 150 may serve to indicate the location or degree of extension of the inner tube assembly 128 and, importantly, the extent of actuation of the load L attached to it. As shown in FIG. 5, a scale 54 may be provided on the outer tube 118 adjacent the slot 140 with markings 56 to indicate, for example, the percent of full extension of the inner tube 118. The pin 46 may carry a pointer or marking 58 that, when the inner tube assembly 128 is fully retracted, aligns with a 0% marking on the scale, and aligns with a 100% marking when the inner tube 128 is fully extended, as well as various markings therebetween to provide a visual indication as to the position of the inner tube assembly 128 relative to full extension and the position of load L.

The pin 146 may also be conveniently used to activate externally mounted control switches 60, which may be positioned at one or more locations along the travel path of the pin 146 to provide feedback to a control system (not shown) used to control the stopping and starting operation of the linear actuator motor, or various other devices. For example, the switches may operate to stop the motor 112 at a given position of extension of the sleeve 128, and when the sleeve 128 returns to inboard position. Switches 60 with their depressible actuators 60a can be mounted for position adjustment, sliding travel along a fixed track 60b provided on housing tube along scale 54.

The disclosed embodiments are representative of presently preferred forms of the invention, but are intended to be illustrative rather than definitive thereof. The invention is defined in the claims.

I claim:

1. A ball screw and nut linear actuator comprising:
   a. a motor with a drive shaft and a longitudinally disposed ball nut and screw assembly in adjacent disposition;
   b. said ball nut and screw assembly comprising a ball screw having helical groove portions separated by helical land portions and a ball nut having axially inner and outer ends on said screw with complemental helical groove portions separated by land portions forming a raceway between the screw and nut groove portions, and recirculating load bearing balls in the raceway;
   c. a drive transmission system spanning and rotatably drivably connecting said drive shaft and screw at said inner end of said screw;
   d. a housing for said system and ball nut and screw assembly, including an elongate cylindrical part coextending with said screw, for housing said assembly and anchoring said screw against axial movement while journaling it for rotation;
   e. said nut incorporating a cylindrical adaptor ring fixed on its outer end to extend laterally from said nut to provide a periphery mounting a cylindrical extension assembly laterally spaced from said nut for adjacent telescoping movement relative to said housing part; and
   f. an axial track in said housing part and a radial ring pin seated in said adaptor ring periphery radially opposite said track received by said track for guiding said extension assembly in axial movement created by motive revolution of said screw to predetermine the path of said extension assembly and prevent its rotation relative to said housing part.

2. The actuator of claim 1 wherein said track includes a slot with longitudinally extending edges extending along said housing part which comprises a housing tube, and said pin guides on said both edges to prevent relative rotation of said housing tube and said sleeve assembly.

3. The actuator of claim 2 wherein indicia indicating the axial extent of said sleeve assembly from said housing tube are provided in axially spaced relation on the exterior of said housing tube along said slot, and at least one limit switch is provided on said housing tube between the indicia with its switch actuator in the path of said pin.

4. The actuator of claim 2 wherein stop surfaces supported by said housing tube in axially spaced relation to be axially stationary therein define a first retracted, axially inboard position of said sleeve assembly within the housing tube and a second axially outboard position of maximum extension of said sleeve assembly from said housing tube to define the stroke of said sleeve assembly.

5. The actuator of claim 4 wherein said slot has terminal end surfaces and is of such longitudinal extent relative to the position of said stop surfaces that said pin projecting into said slot is not engageable axially with said end surfaces of said slot during the stroke of said sleeve assembly.

6. The actuator of claim 2 wherein said slot in said housing tube extends only part way through said housing tube.

7. The actuator of claim 2 wherein said slot in said housing tube extends through said housing tube and has longitudinally extending guide edges closely accommodating said pin to prevent relative rotation of said sleeve assembly and said housing tube.

8. The actuator of claim 7 wherein indicia indicating the relative axial positions of said sleeve assembly and housing tube are provided on said housing tube along said slot.

9. The actuator of claim 8 wherein said sleeve assembly connects to a load member and said indicia are calibrations in the form of a scale indicating the percentages of extent of the sleeve assembly from the housing tube and the position of said load, and said pin has an exposed end surface bearing a position indicating marker thereon.

10. A ball screw and nut linear actuator comprising:
   a. a motor with a drive shaft and a longitudinally disposed ball nut and screw assembly in adjacent disposition;
   b. said ball nut and screw assembly comprising a ball screw having helical groove portions separated by helical land portions and a ball nut having axially inner and outer ends on said screw with complemental helical groove portions separated by land portions forming a raceway between the screw and nut groove portions, and recirculating load bearing balls in the raceway;
   c. a drive transmission system spanning and rotatably drivably connecting said drive shaft and screw;
   d. a housing for said system and ball nut and screw assembly, including an elongate part coextending with said screw, for housing said assembly and anchoring said screw against axial movement while journaling it for rotation;
   e. said nut incorporating an extension assembly fixed to said nut for extending movement relative to said housing part;
   f. a pin and axial track connection between said extension assembly and said part incorporating a pin and track guiding said extension assembly in axial movement created by motive revolution of said screw to predetermine the path of said extension assembly;
   g. said track including a slot with longitudinally extending edges extending along said housing part which comprises a housing tube, and said pin guiding on said both edges to prevent relative rotation of said housing tube and said sleeve assembly;
   h. stop surfaces supported by said housing tube in axially spaced relation to be axially stationary therein defining a first retracted, axially inboard position of said sleeve assembly within the housing tube and a second axially outboard position of maximum extension of said sleeve assembly from said housing tube to define the stroke of said sleeve assembly; and
   i. said sleeve assembly including an adaptor ring on the axially outboard side of said nut and said screw carrying one of said stop surfaces on its axially outboard end which is coactable with said adaptor ring; said pin being carried in a generally radial seat bore provided in said adaptor ring opposite said slot.

11. A method of making a ball screw and nut linear actuator having:
   a. a motor with a drive shaft and a longitudinally disposed ball nut and screw assembly in adjacent disposition;
   b. said ball nut and screw assembly comprising a ball nut having axially inner and outer ends on said screw with complemental helical groove portions separated by land portions forming a raceway between the screw and nut groove portions, and recirculating load bearing balls in the raceway;
   c. a drive transmission system spanning and rotatably drivably connecting said drive shaft and screw at said inner end of said screw;
   d. a housing for said system and ball nut and screw assembly, including an elongate cylindrical part coextending with said screw, for housing said assembly and anchoring said screw against axial movement while journaling it for rotation;
   e. said nut incorporating an adaptor ring fixed on its outer end to extend laterally from said nut to provide a radially outboard periphery mounting a cylindrical extension assembly fixed to said ring for extending telescopic movement relative to said housing part; comprising:
   f. providing an axially extending track in said part with axially extending guide edges on said housing part; and
   g. providing a radial bore in said periphery of said ring and inserting a ring pin into said bore which extends into said track for relative travel therewith; and sizing said pin to be snugly received by said track to guide along said guide edges with axial movement of said nut and extension assembly relative to said housing part.

12. The method of claim 11 comprising providing stops having axially spaced confronting stop surfaces in axially fixed position within said housing tube, between which said nut travels; one of said stop surfaces being provided on said screw on its axially outer end and extending radially to coact with said adaptor ring, and machining said slot so that its terminal ends extend axially beyond the stop surfaces of said stops at both ends of said slot.

13. The method of claim 12 wherein said slot is machined through the wall of said tube, and said method further includes providing indicia in the form of a scale along said slot to indicate the relative axial positions of the sleeve assembly and housing tube, and the position of the load member to be attached to said sleeve assembly.

14. The method of claim 11 including the step of providing a track is accomplished by forming a slot through said housing tube, and including the further step of mounting at least one limit switch on said housing tube with its switch actuator in the path of said pin.

15. The method of claim 14 including the further step of providing indicia axially in the form of a scale along said slot to indicate the relative extension position of said sleeve assembly, and positioning said limit switch actuator at a desired position relative to said scale.

16. In a method of operating a ball screw and nut linear actuator comprising a motor with a drive shaft and ball nut and screw assembly in side by side disposition; said ball nut and screw assembly comprising a ball screw having helical groove portions separated by helical land portions and a ball nut having axially inner and outer ends on said screw with complemental helical groove portions separated by land portions forming a raceway between the screw and nut groove portions with recirculating load bearing balls in the raceway; gearing spanning and disengageably drivably connecting said drive shaft and said inner end of said screw; a housing for said gearing and ball nut and screw assembly, including an elongate cylindrical tube coextending with said screw, for housing said assembly and fixing said screw against axial movement while journaling it for rotation; said nut incorporating an adapter ring fixed on its outer end to extend laterally from said nut to provide a radially outboard periphery mounting a cylindrical extension sleeve assembly fixed to it for extending telescopic movement with said nut relative to said housing tube; a radial ring pin anchored in said periphery of said ring and an axial track in said housing tube receiving said pin and guiding said sleeve assembly in axial movement created by motive revolution of said screw to predetermine the path of said sleeve assembly, the steps of:

a. operating said motor to drive said gearing and revolve said screw, thereby causing said balls to drive said nut sleeve assembly axially along said screw in a direction to extend said sleeve assembly from said tube; and b. restraining rotary travel of said ring and sleeve by causing relative guiding movement of said ring pin along said track during relative axial travel.

17. The method of claim 16 comprising providing inboard and outboard stops in said housing tube to provide axially confronting stop surfaces, one of said stop surfaces being provided on the outer end of said screw for coaction with said ring to halt said extension sleeve assembly, and said track has terminal ends which extend axially beyond said stop surfaces at each end of said track, and said method includes the further steps of:

c. causing said nut to be halted by one of said stop surfaces before said pin reaches each terminal end of said track.

18. The method of claim 16 wherein indicia in the form of a scale indicating the relative position of extent of the sleeve assembly from the housing tube are provided along said track and a pointer is provided on said pin, and the method includes the further step of:

d. connecting said sleeve assembly to a member to be actuated; and e. comparing the position of said pointer relative to the scale to determine the position of extension of the sleeve assembly from the tube and the extent of actuation of said member.

* * * * *